United States Patent
Caulfield et al.

(10) Patent No.: US 6,937,163 B2
(45) Date of Patent: Aug. 30, 2005

(54) APPARATUS AND METHOD FOR PREVENTING A PICTURE FROM BEING TAKEN BY FLASH PHOTOGRAPHY

(76) Inventors: Jeremy J. Caulfield, 2539 E. Cinnabar Ave., Phoenix, AZ (US) 85028; Joseph A. Caulfield, 2539 Cinnabar Ave., Phoenix, AZ (US) 85028

(*) Notice: Subject to any disclaimer, the term of this patent is extended or adjusted under 35 U.S.C. 154(b) by 0 days.

(21) Appl. No.: 10/437,853

(22) Filed: May 14, 2003

(65) Prior Publication Data

US 2004/0227634 A1 Nov. 18, 2004

(51) Int. Cl.[7] ............................................. G08G 1/017
(52) U.S. Cl. .................... 340/937; 340/425.5; 362/494; 348/132
(58) Field of Search .............................. 340/425.5, 436, 340/905, 933, 936, 937, 332; 362/494, 540, 545, 497; 353/122, 30, 94, 112; 348/132, 149

(56) References Cited

U.S. PATENT DOCUMENTS

| | | | | |
|---|---|---|---|---|
| 5,418,596 A | * | 5/1995 | Goto | 396/106 |
| 6,132,072 A | * | 10/2000 | Turnbull et al. | 362/494 |
| 6,351,208 B1 | * | 2/2002 | Kaszczak | 340/425.5 |
| 6,672,745 B1 | * | 1/2004 | Bauer et al. | 362/545 |
| 6,742,901 B2 | * | 6/2004 | Kimura et al. | 353/122 |
| 6,773,119 B2 | * | 8/2004 | Kimura et al. | 353/122 |

* cited by examiner

Primary Examiner—Van T. Trieu
(74) Attorney, Agent, or Firm—Jeffrey D. Moy; Harry M. Weiss; Weiss, Moy & Harris, P.C.

(57) ABSTRACT

An apparatus and method for preventing a photographic image from being taken has a triggering mechanism which will generate a signal when detecting a light signal indicative of a camera flash. A flash unit is coupled to the triggering mechanism for generating a counteracting flash after receiving the signal generated by the triggering mechanism. By generating a counteracting flash a very short time after detecting the flash, the apparatus saturates an area of the camera's image field during the camera's exposure period. Thus the image in that area is obscured.

9 Claims, 1 Drawing Sheet

APPARATUS AND METHOD FOR PREVENTING A PICTURE FROM BEING TAKEN BY FLASH PHOTOGRAPHY

BACKGROUND OF THE INVENTION

1. Field of the Invention

This invention relates generally to photography and, more specifically, to an apparatus and method which prevents one's picture from being taken by a person using flash photography.

2. Description of the Prior Art

Flash photography has been around for many years. The problem is that many people do not want to have their picture taken for one reason or another. For example, many celebrities do not want to have their picture taken because they feel it is an invasion of their privacy. Also, many countries, as well as cities in the United States have begun to monitor activities on the street by using video cameras, as well as flash photography. Many citizens also feel that this is an invasion of their privacy and do not want their picture to be taken.

U.S. Pat. No. 6,351,208 issued on Feb. 26, 2002 discloses a device for preventing detection of a traffic violation. This device uses an ultraviolet laser emitter which interferes with the photographing of a traffic violation by vehicle by an automatic camera used to monitor traffic violations. The use of the ultraviolet emitter hinders the ability of the camera to take a picture. The ultraviolet laser works by hindering the ability of a radar device from accurately measuring the speed of a vehicle. Thus, an accurate picture cannot be taken. The problem with the above is that it is questionable whether it is lawful to actually interfere with the operation of the radar detection unit and/or the automatic camera. Taking the photograph.

Therefore a need existed to provide an improved apparatus and method for protecting the privacy of individuals. The improved system and method would protect people's privacy by obscuring their identity when their picture is taken.

SUMMARY OF THE INVENTION

In accordance with one embodiment of the present invention, it is an object of this invention to provide an apparatus and method for protecting the privacy of individuals.

It is another object of the present invention to provide an apparatus and method for protecting the privacy of individuals by hiding the identity of the person.

It is still another object of the present invention to provide an apparatus and method which hides the identity of the person by hindering the taking of photographs by flash photography.

BRIEF DESCRIPTION OF THE PREFERRED EMBODIMENTS

In accordance with one embodiment of the present invention, an apparatus for obscuring a photographic image from being taken is disclosed. The apparatus has a triggering mechanism which will generate a signal when detecting a light signal from a camera flash. A flash unit is coupled to the triggering mechanism. The flash unit is used for generating a counteracting flash after receiving the signal generated by the triggering mechanism. The counteracting flash saturates an image field of the camera with light to obscure the photographic image that is taken.

In accordance with another embodiment of the present invention, a method for obscuring a photographic image from being taken is disclosed. The method comprises the steps of: sensing a light source indicative of a flash illumination from a camera; and generating a counteracting flash to saturate an area where the photographic image is being taken.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENTS

Figure 4:
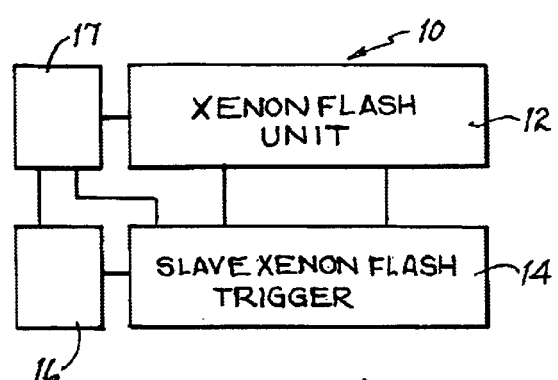
FIG. 4 is a simplified electrical block diagram of the apparatus of the present invention.

Referring to FIGS. 1–4 wherein like numerals and symbols represent like elements, an apparatus 10 is shown which obscures the identity of a person when a picture is taken by flash photography. As can be seen in FIG. 4, the apparatus 10 has a flash unit 12 which is coupled to a triggering unit 14. The flash unit 12 is generally a high intensity flash unit like a xenon flash unit or the like. However, the listing of the above should not be seen as to limit the scope of the present invention. Other types of flash units 12 may be used without departing from the spirit and scope of the present invention.

The triggering unit 14 has a sensor 16 which detects a light signal which is characteristic of a flash illumination from a camera 18. When a light signal is detected by the sensor 16, the triggering unit 14 will send a signal to the flash unit 12 causing the flash unit 12 to generate a counteracting flash illumination. By generating a counteracting flash a very short time after detecting a flash, the apparatus 10 saturates an area of the camera's image field during the camera's exposure period. Thus, by having the apparatus located near the individual whose picture is to be taken, the person's image will be obscured.

The apparatus 10 is powered by a power supply 17. The power supply 17 may be one of several different means. For example, the apparatus 10 may be powered by a battery source. The battery source may operate independently or, to prolong the life of the battery, the battery may be coupled to a solar charge unit. A solar panel could also be used as the main power source. The apparatus 10 could also be powered by a 12 volt power supply which is found in most automobiles via the cigarette lighter. The power supply 17 provides power to the flash unit 12, the triggering unit 14, and the sensor 16. The power supply 17 may be directly coupled to each of the elements of the apparatus 10. Alternatively, power may flow from one element to the next so that each of the different elements will receive power.

In order to operate in an effective manner, the triggering unit 16 should delay for a short period of time before sending the signal to generate the counteracting flash to the flash unit 12. The necessary response time between flash sensing and flash generation depends on the exposure period of the camera acquiring the image. For example, a typical photographic camera has an exposure time in excess of one millisecond. Thus a 100 microsecond response time is sufficient for obscuring an image acquired by most photographic cameras. Video cameras have exposure times of about 1/60 of a second. Thus, response times of several milliseconds should be acceptable for obscuring images acquired by such cameras.

To further operate in a more efficient manner, the sensor 16 should be set only to cause the trigger unit 14 to send a signal when the sensor 16 receives a light signal above a predetermined intensity level which is characteristic of a flash from a camera. Most light sensors 16 should have this ability. Alternatively, a more sophisticated sensor 16 could also be used which detects a rapidly increasing light intensity which is also characteristic of a flash. It should be noted that these are only examples of the type of sensor 16 and method which could be used in the triggering unit 14. These examples should in no way be seen or interpreted to limited the scope of the invention.

Figure 1:
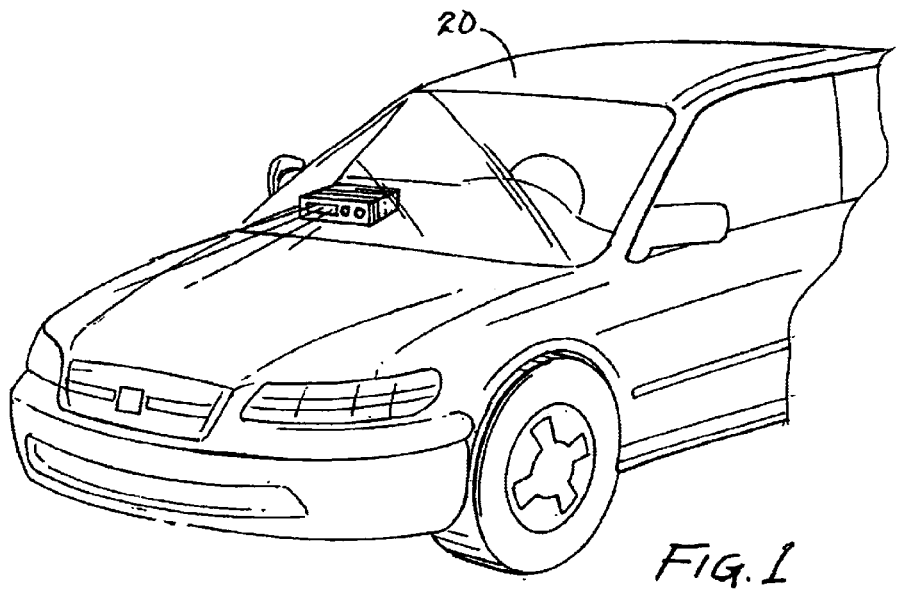
FIG. 1 is an elevated perspective view of the apparatus of the present invention position for use in an automobile.

In operation, the apparatus 10 could be mounted to an automobile 20 as shown in FIG. 1. The apparatus 10 may be mounted in the front of the automobile 20, the rear of the automobile 20, and anywhere else on the automobile where one would like to obscure a photograph from being taken. If the apparatus 10 is mounted to a rear section of the automobile, the apparatus 10 should be slightly recessed. This will focus and direct the counteracting flash so that the counteracting flash will not blind individuals who may be following the vehicle 20.

Figure 2:
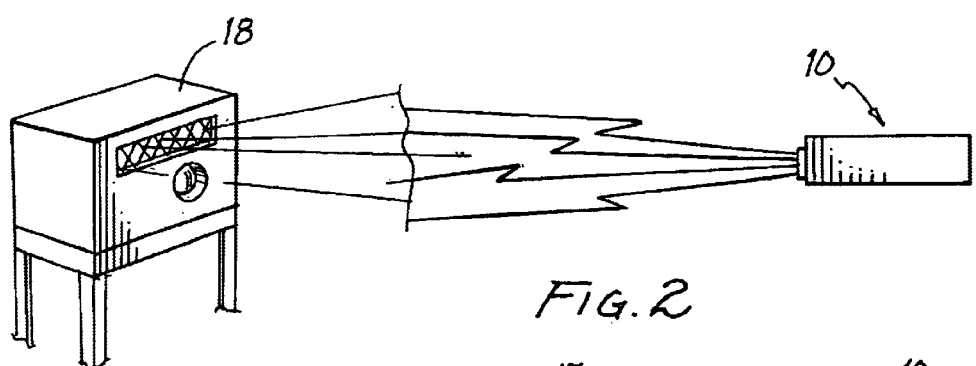
FIG. 2 is an elevated perspective view of the apparatus of the present invention in use blocking a flash photo.
Figure 3:
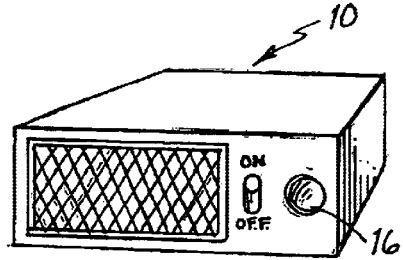
FIG. 3 is an elevated front view of the apparatus of the present invention.

When the apparatus 10 is turned on, the sensor 16 will send a signal to the flash unit 12 when the sensor 16 detects a light signal characteristic of a flash illumination from a camera 18 such as from the paparazzi or a photo radar camera. The flash unit 12 will then send out a counteracting flash as shown in FIG. 2 towards the camera 18. The counteracting flash will saturate the area of the camera's image field during the camera's exposure period. Thus, the image of the person in the automobile 20 would be obscured preventing that person's picture from being taken.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for obscuring a photographic image comprising, in combination:

a triggering mechanism which will generate a signal when detecting a light signal which has characteristics of a photo flash illumination from a camera;

a sensor for detecting the light source;

a flash unit coupled to the triggering mechanism for generating a counteracting flash after receiving the signal generated by the triggering mechanism; and a power supply for powering the apparatus;

wherein the triggering mechanism delays sending the generated signal for a short period of time after detecting the light source.

2. An apparatus for obscuring a photographic image in accordance with claim 1 wherein the triggering mechanism delays sending the generated signal for 100 microseconds after detecting the light source.

3. An apparatus for obscuring a photographic image in accordance with claim 1 wherein the power supply is a battery.

4. An apparatus for obscuring a photographic image in accordance with claim 1 wherein the power supply is a DC voltage source from an automobile.

5. An apparatus for obscuring a photographic image in accordance with claim 1 wherein the power supply is a solar source.

6. A method for obscuring a photographic image from being taken comprising the steps of:

sensing a light source indicative of a flash illumination from a camera;

generating a counteracting flash to saturate an area where the photographic image is being taken;

waiting for the camera's overexposure period before generating the counteracting flash.

7. The method of claim 6 further comprising the steps of providing a sensor for sensing the light source indicative of a flash illumination from a camera.

8. The method of claim 7 further comprising the steps of providing a flash unit for generating the counteracting flash to saturate the area where the individual's picture is being taken.

9. The method of claim 8 further comprising the step of providing a triggering device coupled to the sensor for sending a signal to the flash unit that a light source indicative of a flash illumination from a camera has been detected and to signal the flash unit to generate the counteracting flash to saturate the area where the individual's picture is being taken.

* * * * *